United States Patent [19]

Graefe

[11] Patent Number: 4,801,325
[45] Date of Patent: Jan. 31, 1989

[54] METHOD FOR PRODUCING HIGH-GRADE FERTILIZER AND USEFUL SIDE PRODUCTS

[76] Inventor: Gernot Graefe, Bergstrasse 6, A-7082 Donnerskirchen, Austria

[21] Appl. No.: 380,728
[22] PCT Filed: Sep. 10, 1981
[86] PCT No.: PCT/AT81/00023
  § 371 Date: May 10, 1982
  § 102(e) Date: May 10, 1982
[87] PCT Pub. No.: WO82/00999
  PCT Pub. Date: Apr. 1, 1982

[30] Foreign Application Priority Data
  Sep. 11, 1980 [AT] Austria .................... 4586/80

[51] Int. Cl.[4] ............................... C05F 5/00
[52] U.S. Cl. .............................. 71/9; 71/23; 71/26
[58] Field of Search ...................... 71/8-11, 71/23, 25, 26; 47/1.4, 19

[56] References Cited
U.S. PATENT DOCUMENTS
  4,211,545 7/1980 Graefe .................. 71/26 X Primary Examiner—Ferris H. Lander
Attorney, Agent, or Firm—Toren, McGeady & Associates

[57] ABSTRACT

Method for producing high-grade fertilizer and useful side products from pips, wherein, after the aerobic decay of press residues from wine production, the pips are separated from the decay product by sieving, are opened by crushing and are subjected to another aerobic decay, and wherein the components of the decayed crushed pips are divided by sieving into three fractions of different particle sizes, the fine fraction of which contains predominantly or almost exclusively humified seedlings and humified nutrient tissue of the grape seed, the coarse fraction consists predominantly of thirds and quarters of pip walls, and the middle fraction includes smaller pip wall pieces.

7 Claims, 1 Drawing Sheet

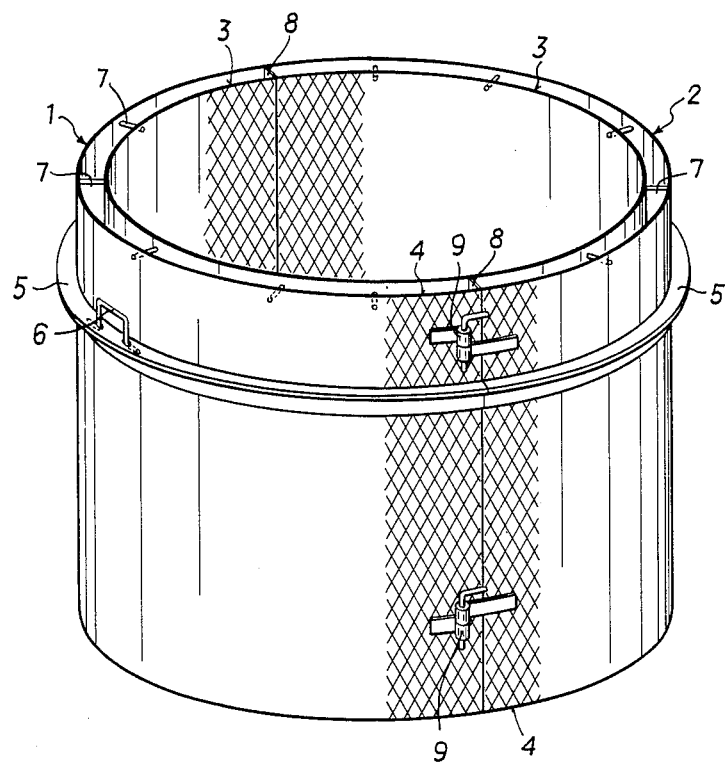

METHOD FOR PRODUCING HIGH-GRADE FERTILIZER AND USEFUL SIDE PRODUCTS

A method for producing high-grade fertilizer is described in Austrian Pat. No. 344,210, wherein food residues, particularly press residues from wine production, are arranged in a loose form and, for example, by rearranging the residues, are subjected to an aerobic decaying process in the loose state, possibly with the utilization of the generated heat and $CO_2$, and wherein, after the decaying process has ended, a division of the resulting substance is effected by sieving and the fraction containing the pips is further processed, for example, crushed and subjected to a post-decaying process. The decayed crushed pips have been found an extremely effective fertilizer.

It is the object of the invention to further develop the known method, wherein the decayed crushed pips are again divided into fractions. It has been found that the resulting fractions have different properties which can be utilized for specific purposes.

Therefore, the invention relates to a method for producing high-grade fertilizer and useful side products from pips, wherein, after the aerobic decay of press residues from wine production, the pips are separated from the decay products by sieving, are opened up by crushing and are subjected to another aerobic decay, and which is characterized in that the components of the decayed crushed pips are divided into three fractions of different particle sizes by means of sieving, the fine fraction of which contains predominantly or almost exclusively humified seedling and humified nutrient tissue of the grape seed, the coarse fraction consists predominantly of thirds and quarters of pip walls and the middle fraction includes smaller pieces of the pip walls. A sieving method has been found useful wherein the components of the decayed crushed pips of a size less than 0.5 mm are assigned to the fine fraction, those with a size of between 0.5 and 1.0 mm are assigned to the middle fraction and the larger components are assigned to the coarse fraction. For many purposes, it has been found that the coarse fraction is capable of performing its task even when it had earlier been leached with water. This liquid represents an excellent liquid fertilizer.

The invention further relates to certain types of application of the fractions obtained in accordance with the invention.

When the decay of the crushed pips described in Austrian Pat. No. 344,210 has subsided, the cold material is sieved in accordance with the invention. For this purpose mesh sizes of 0.5 and 1.0 mm have proved useful. The separating process is performed by means of sieve drums which are slightly inclined and are used in many technical applications.

It has been found that the fine fraction represents a high-grade fertilizer because it contains large quantities of microorganisms. When the fertilizer is introduced into the ground, the microorganisms continue to perform their function and gradually contribute to the mineralization of the fertilizer. Only microbial processes set free the organically bound nitrogen and make it available for the plant roots. This fraction consists predominantly or almost exclusively of the humified seedling and the humified nutrient tissue of the grape seed and this fraction is therefore particularly suitable as fertilizer for plant saplings or potting soil.

The portion of the fine fraction is about 18 to 20% by volume. The portion of the middle fraction varies between 20 and 30% by volume and consists predominantly of small fragments of the pip wall. The coarse fraction represents 50 to 62% by volume and consists of large fragments, such as, thirds or quarters of pip walls. Residues of the humified seedlings and nutrient tissue which could not be completely separated during the sieving process adhere to the cavities of these larger particles. When the coarse fraction is leached by means of water, these humified residues are transferred into the liquid. These residues contain many phytohormones.

The finely crumbly fraction contains all growth substances, nutrients and reserves which a seedling needs for germination in the early time of its existence, because it is only later capable of absorbing through the roots and of producing these substances through its metabolic powers.

The middle fraction is not to be leached. Due to the relatively large surfaces of fracture of these small pip wall particles, larger quantities of tanning matter than is desirable are transferred into the liquid. Another reason for avoiding a leaching of the middle fraction resides in that spores of the microorganisms which had previously been developed in the substrate adhere to the surfaces of the particles. This fraction gains its importance as a carrier of the 22 species of thermophilic microorganisms and 39 species of mesophilic microorganisms which have been discovered so far in the humification of marc. Even small quantities of this fraction can supply large amounts of organic material with spores, so that the decay or microbial degradation of this material is started or at least promoted. If this fraction were to be leached, the portion of spores would be substantially reduced and, thus, the effectiveness of the fraction as an animator for the decaying and humification processes would be decreased.

The coarse fraction is also capable of forcing a hot decay of the admixed organic substances. Of course, this is only true if this fraction had not previously been leached.

In this manner, it is possible to eliminate a great portion of dangerous waste matter, resulting in a material which has fertilizer qualities. For example, spoiled animal feed and foodstuffs can be converted into fertilizer. In crushed soybeans or in peanuts there sometimes develops the *Aspergillus flavus* which produces the cancerogenic flavotoxin which is a product of metabolism and poisonous. When the spoiled material is mixed with the coarse crushed pips, a hot decay is started in which a great portion of the toxins is degraded. The product is essentially harmless and can possibly be used as fertilizer. In order to utilize the heat generated during the hot decay, it is advantageous to store spoiled organic substances until the cold season begins, when they can be burned microbially by means of the middle fraction or the coarse, unleached fraction. Following the hot decay, the humified admixture can be separated in a sieve drum and the coarse fraction can be stored until its next use. This is because it has been found that the coarse components of the pip walls are substantially resistant to the hot decay. This is due to their tannic matter and lignin incrustations, which protect the pip wall from the premature decomposition by microbial activity.

The middle and coarse fractions have an odor-absorbing property. This property is maintained even after leaching the coarse fraction. Accordingly, if this property is of primary importance, leached crushed pips are to be used.

The odor-absorbing property has particular significance in the humification of feces.

The drawing schematically shows a chamber with double walls of expanded metal.

The chamber wall consists of two semi-cylindrical shells 1, 2 which, when placed together, form a hollow cylinder of circular cross-section. Each wall portion 1, 2 has an inner casing 3 and an outer casing 4 of expanded metal which at the bottom are tightly connected to one another by means of a semicircular strip of sheet metal. The outer casing 4 carries a semicircular ring 5, preferably of L-shaped cross-section. This ring is fixed to the casing 4 and each semicircular ring is provided with a grip 6. The bottom between the inner casing 3 and the outer casing 4 and the ring 5 provide sufficient stability for the shells 1,2. Furthermore, the two casings 3,4 of each half shell are connected to one another by means of spacer bolts 7. At the abutting edges of the shells 1 and 2, the cylinder walls 3 and 4 are connected by a strip 8 each, so that an annular hollow space is formed between the walls 3 and 4 which is defined by the bottom below and laterally by the sheet metal strip 8 and toward the inside and outside by expanded metal. The two half shells can be connected to one another in any chosen manner; a tightening connection 9 is illustrated in the drawing.

Crushed pips are filled into this hollow space and the unpleasantly smelling substance is placed into the center of the chamber. Tests have shown that the distance between the walls 3 and 4 may be 2 to 10 cm. When crushed pips are filled into the hollow space, a wall thickness of 2 cm ensures that substantially no odor is passing through. If coarse crushed pips are used, the wall thickness should be at least 4 cm. A heat exchanger tube capable of removing heat from the odor-absorbing layer can also be accommodated in the annular hollow space formed by the walls 3, 4. The chamber which is placed on a flat surface is covered at the top after the foul-smelling substance has been introduced. Since the odor-absorbing layer is air-permeable, oxygen can reach into the chamber in order to facilitate the microbial degradation of the contents.

Such a chamber is particularly suitable for receiving the contents of humus closets which are hot-composted in this chamber. As a result, the eggs of parasites and pathogenic agents contained in the feces are completely and safely decayed in a manner which is environmentally safe and develops little odor. The obtained product represents a valuable fertilizer which is rich in nutrients and is particularly suitable for growing vegetables. Scientific tests which have been performed show that worm eggs can be safely destroyed by the heat developed by the crushed pips. This process is particularly suitable for the disposal of feces in large refugee camps. The decaying process can be accelerated by depositing on the bottom of the chamber undecayed crushed pips as they are obtained in the method according to Austrian Pat. No. 344,210 and by occasionally spreading them on the feces. In this case, the double ring of the chamber does not have the task of releasing heat, but of retaining the heat generated in the chamber and of preventing odor from penetrating to the outside, while still ensuring that oxygen can reach the interior of the chamber.

The same device can also be used for composting garden and kitchen wastes. In this case, the coarse fraction within the double wall prevents the compost from drying out and promotes the penetration of the spores of microorganisms into the interior and prevents the escape of foul odors, so that even foul-smelling materials can be introduced into the compost silo.

The leached, coarse fraction can be used in a similar manner for filling a filter. This fraction is suitable as the basic bulk material of humus closets and for spreading in areas where animals are kept.

A special application of this fraction resides in preparing a mulch layer in plant cultivation. The material provides gaps which counteract the drying-up process. Unleached crushed pips are used if a fertilizing effect is to be achieved at the sametime. Such a mulch layer has resulted in that fine roots of tomato plants have quickly grown into this layer and have taken moisture and nutrients from this layer. Rain or watering causes the valuable substances to be washed out of the mulch layer and to be introduced into the soil, so that they reach the root area.

As already mentioned above, leaching the coarse fraction results in a liquid fertilizer which is stable and available for a long time. This fertilizer is capable of penetrating the root area of a plant within a few minutes. The reaction of the plant can be observed after a few days.

It is also possible to obtain the three fractions by separating the crushed pips by sieving them prior to their decay. However, it has been found that the coarse fragments of the pip walls do not become hot by themselves and that the fine fraction is completely built up only very slowly, because the fine components leave open a sufficient gap system in order to provide sufficient oxygen to the aerobic decaying process in the interior. If, however, the decay of the crushed pips is performed prior to the sieving process, then it takes place briskly because the larger fragments of the pip walls, while not directly taking part in the hot decay, maintain a coarser gap system in the substrate and, therefore, ensure that the oxygen can better penetrate into the interior and ensure a vivid metabolism.

The middle fraction and the coarse fraction can also be used together. For example, in a humus closet, the coarse crushed pips can be used as the substrate and the middle fraction can be used for covering the feces. As a result, the problem of foul odor is eliminated and flies are kept away. The coarse crushed pips which have a better gas exchange capability are responsible for the decaying processes in the interior of the substrate. Surprisingly, the few spores which adhere to the coarse fraction are sufficient for starting a hot decay. This is true even when the fraction had been leached. It is always the microbe flora present on the crushed pips which is basically responsible for the temperature rise during the decay or the humification when some degradable matter is supplied to it. Surprisingly, this mechanism operates even when the numbers of microbes are low and the amount of degradable wastes exceeds the amount of crushed pips. By an exponential growth, the best-adjusted microorganisms in the material supplied to the crushed pips will be present in a sufficient number after a series of doubling times for handling the degradable organic substance.

The middle fraction can also be used as a buffer and safety material. This fraction can be used to encase tanks for transporting dangerous liquids, wherein the volume of such a casing should be about twice the volume of the tank. When dangerous liquid leaks out, it will be absorbed and bound by the surrounding material.

The pips should be crushed in such a manner that the pip walls are not broken into very small particles. By using a crushing mill of stone material it was possible to ensure that only a very small portion of pip wall fragments is contained in the fine fraction.

I claim:

1. In a method for producing high-grade fertilizer and useful side products from pips, wherein, after the aerobic decay of press residues from wine production, the pips are separated from the decay product by sieving, are opened by crushing and are subjected to another aerobic decay, the improvement which comprises dividing the components of the decayed crushed pips into three fractions of different particle sizes by means of sieving, the fine fraction of which contains predominantly or almost exclusively humified seedlings and humified nutrient tissue of the grape seed, the coarse fraction consists predominantly of thirds and quarters of pip walls, and the middle fraction includes smaller pip wall pieces.

2. The method according to claim 1, wherein the components of the decayed crushed pips having a size of less than 0.5 mm are assigned to the fine fraction, those having a size of between 0.5 and 1.5 mm are assigned to the middle fraction, and the larger components are assigned to the coarse fraction.

3. A method for the elimination of foul odors from materials comprising adding to said materials an effective amount of the coarse fraction obtaining according to the method of claim 1 or 2.

4. A method for filtering comprising using as the filter, the coarse fraction obtained from the method of claim 1 or 2.

5. The coarse fraction obtained according to the method of claim 1 or 2.

6. The method according to claim 1 or 2, wherein the coarse fraction is leached with water and is then dried.

7. The coarse fraction obtained according to the method of claim 6.

* * * * *